(12) United States Patent
Gauthier et al.

(10) Patent No.: US 7,776,234 B2
(45) Date of Patent: Aug. 17, 2010

(54) METHOD FOR PREPARING COMPOSITE MATERIALS COMPRISING AN ELECTRODE ACTIVE COMPOUND AND AN ELECTRONIC CONDUCTOR SUCH AS CARBON IN PARTICULAR FOR A LITHIUM BATTERY

(75) Inventors: Gilles Gauthier, Bilieu (FR); Frederic Le Cras, Notre Dame-de-l'Osier (FR); Helene Lignier, Saint-Laurent-du-Pont (FR); Jean-Louis Gabelle, Crolles (FR)

(73) Assignee: Commissariat a l'Energie Atomique, Paris (FR)

( * ) Notice: Subject to any disclaimer, the term of this patent is extended or adjusted under 35 U.S.C. 154(b) by 170 days.

(21) Appl. No.: 10/586,601

(22) PCT Filed: Jan. 26, 2005

(86) PCT No.: PCT/FR2005/050045
§ 371 (c)(1),
(2), (4) Date: Jan. 4, 2007

(87) PCT Pub. No.: WO2005/076390
PCT Pub. Date: Aug. 18, 2005

(65) Prior Publication Data
US 2007/0152185 A1 Jul. 5, 2007

(30) Foreign Application Priority Data
Jan. 28, 2004 (FR) .................................. 04 50156

(51) Int. Cl.
*H01B 1/08* (2006.01)
(52) U.S. Cl. ................... 252/506; 252/519.1; 252/521.2
(58) Field of Classification Search ................. 252/506, 252/519.1, 521.2
See application file for complete search history.

(56) References Cited

U.S. PATENT DOCUMENTS 3,330,697 A 7/1967 Pechini

| | | | |
|---|---|---|---|
| 5,910,382 A * | 6/1999 | Goodenough et al. | .... 429/218.1 |
| 6,391,493 B1 * | 5/2002 | Goodenough et al. | .... 429/218.1 |
| 6,514,640 B1 * | 2/2003 | Armand et al. | .......... 429/231.1 |
| 2002/0195591 A1 * | 12/2002 | Ravet et al. | .................. 252/500 |
| 2004/0140458 A1 * | 7/2004 | Ravet et al. | .................. 252/500 |
| 2004/0151649 A1 * | 8/2004 | Hemmer et al. | ............. 423/306 |
| 2006/0204848 A1 * | 9/2006 | Franger et al. | ........... 429/231.1 |
| 2007/0245546 A1 * | 10/2007 | Le Cras et al. | ............. 29/623.1 |

FOREIGN PATENT DOCUMENTS

| | | |
|---|---|---|
| BE | 735 476 | 12/1969 |
| CA | 2 270 771 | 10/2000 |
| CH | 513 769 | 10/1971 |
| WO | 97 40541 | 10/1997 |
| WO | 02 083555 | 10/2002 |

OTHER PUBLICATIONS

Hsu et al., "Synthesis and characterization of nano-sized LiFePO4 cathode materials prepared by a citric acid-based sol-gel route", Journal of Materials Chemistry, 14 (Jul. 1, 2004), 2690-2695.*

Du et al., "Preparation and Performance of Spinel LIMN2O4 by a Citrate Route with Combustion", Journal of Alloys and Compounds, vol. 352, No. 1-2, pp. 250-254, 2003.

* cited by examiner

*Primary Examiner*—Douglas Mc Ginty
(74) *Attorney, Agent, or Firm*—Oblon, Spivak, McClelland, Maier & Neustadt, L.L.P.

(57) ABSTRACT

The present invention relates to a process for preparing composite materials comprising an electrode active compound of formula $A_aD_dM_mZ_zO_oN_nF_f$, such as an alkali metal ion, such as a lithium ion, insertion compound, and an electronically conducting compound, such as carbon, in which a homogeneous mixed precursor containing all the elements A, D, M, Z, O, N and F forming the electrode active compound and also one or more organic and/or organometallic compounds are thermally decomposed, in a short period of time, so as to obtain the composite material. These composite materials in particular find their application in devices containing said compounds and/or active materials, such as electrochemical devices and batteries, in particular lithium batteries.

27 Claims, No Drawings

METHOD FOR PREPARING COMPOSITE MATERIALS COMPRISING AN ELECTRODE ACTIVE COMPOUND AND AN ELECTRONIC CONDUCTOR SUCH AS CARBON IN PARTICULAR FOR A LITHIUM BATTERY

The present invention relates to a process for preparing composite materials comprising an electrode active compound, such as an alkali metal ion, for instance a lithium ion, insertion compound, and an electronically conducting compound, such as carbon.

These composite materials find their application in particular in devices containing said active compounds and/or materials, such as electrochemical devices and batteries, in particular lithium batteries.

Lithium batteries are becoming increasingly used as autonomous energy sources, in particular in portable equipment such as computers, telephones, personal organizers, camcorders, etc., where they are gradually tending to replace nickel-cadmium (NiCd) batteries and nickel-metal hydride (NiMH) batteries.

This development comes from the fact that the performance levels of lithium batteries in terms of energy density (Wh/kg, Wh/l) are largely superior to those of the two types mentioned above.

The electrode active compounds used in these batteries are mainly $LiCoO_2$, $LiNiO_2$ and $LiMn_2O_4$ for the positive electrode and carbon, such as graphite or coke, etc., for the negative electrode. The theoretical and practical capacities of these compounds are, respectively, 275 mAh/g and 140 mAh/g for $LiCoO_2$ and $LiNiO_2$, and 148 mAh/g and 120 mAh/g for $LiMn_2O_4$, for an operating voltage with respect to the lithium metal in the region of 4 volts.

Most of the battery systems currently marketed thus use the $LiCoO_2$/C pair, but numerous problems of cost and of toxicity arise, which are related to the element cobalt, and problems of intrinsic safety of the system arise, related to the instability and/or the reactivity of $Li_{1-x}Co_xO_2$ with respect to the electrolyte used.

Similarly, nickel oxides present major difficulties, again due to their high toxicity.

Manganese oxides, for their part, and particularly the family with the spinel structure $Li_{1+x}Mn_{2-x}O_4$ ($0 \leq x \leq 0.33$), are capable of demonstrating electrochemical performance levels comparable with those of cobalt oxides and nickel oxides. It is also apparent that the greater natural abundance of manganese and the lower toxicity of its oxides in comparison with cobalt and nickel are an important advantage for their wide use in batteries.

In the specific case of $LiMn_2O_4$, it is nevertheless established that its combined use with electrolytes formulated for operation in the vicinity of 4 volts with respect to lithium metal, which comprise lithium hexafluorophosphate, results in a gradual dissolution of the manganese oxide and, consequently, in a shorter lifetime of the battery.

Two families of compounds used for electrochemical reactions are, firstly, the family isotypic with olivine and, secondly, the Nasicon family; it should be recalled that the name Nasicon means sodium (Na) superionic conductor and that this compound corresponds to the formula $Na_xM_2X_3O_{12}$. These two families are composed of equivalent elements and differ only in the polyanions number/lithium number ratio and in their crystalline structure. This is because the family isotypic with olivine has an orthorhombic crystal unit cell and the family isotypic with Nasicon of formula $A_xM_2X_3O_{12}$ has a rhombohedral unit cell.

Materials with a structure isotypic with olivine with an orthorhombic crystal unit cell, such as $Li_{1-x}Fe_xPO_4$, for example $LiFePO_4$ (triphylite) have the advantage of being potentially inexpensive and nontoxic. In the case of $LiFePO_4$, the insertion/extraction of lithium takes place according to a two-phase process at 3.45 $V/Li^+/Li$, which renders this compound stable in virtually all organic solvents. Furthermore, it proves to be much more stable in the charged state ("$FePO_4$") in the presence of electrolyte than the oxides mentioned above, resulting in great operating safety in the batteries.

However, the major problem with this family of compounds is their low electronic and ionic conductivities at ambient temperature. Thus, this limits the kinetics of insertion/removal of lithium within the host structure and limits the use of these compounds to relatively low charging/discharging rates.

In order to solve this problem and to overcome these limitations, various means have been considered: it is thus possible to either carry out a partial substitution of the iron with another metal; or to produce a composite including—alongside the electrochemically active compound or electrode active compound, such as $LiMn_2O_4$ or $LiFePO_4$—an electronically conducting compound such as carbon; in the latter case, the two compounds, i.e. the electrochemically active material and the carbon, must be in the form that is as divided as possible in order to shorten as much as possible the ionic and electronic diffusion paths.

The latter approach is described in particular in Canadian document CA-A-2 270 771, which relates to an electrode material comprising a complex oxide at the surface of which is deposited, homogeneously, a carbon-based conducting material, for example by pyrolysis of an organic material such as a polymer.

The composite materials comprising an electrode active compound and an electronically conducting compound are generally prepared by first of all synthesizing said active compound such as $LiFePO_4$, then by forming the composite: (i) either by intimate mixing of the active compound, such as lithium iron phosphate, and of carbon black, for example acetylene black; (ii) or by decomposition under inert gas of an organic compound, for example of cellulose, following synthesis of the active compound such as $LiFePO_4$.

Synthesis processes that make it possible, in general, to obtain the active compounds of formula $LiMXO_4$ (for example $LiFePO_4$), in which M represents a transition metal or a mixture of transition metals, and X represents P, Si, S, Al, Ge or As, etc., are either solid processes or aqueous processes.

Solid synthesis processes are processes which use reactants exclusively in the solid state, and employ high temperatures, i.e. generally above 600° C., and which generally comprise calcination, under a neutral atmosphere, of a mixture of precursors ground more or less vigorously.

These solid processes have many deficiencies, both in terms of the conditions for implementing them and the products obtained.

The synthesis is lengthy—the duration thereof takes 24 hours—and is carried out under conditions that can be described as severe in terms, in particular, of the temperature, which is extremely high. These conditions are necessary in order to obtain highly pure materials having a homogeneous composition.

As a result, these processes, referred to as "all solid synthesis processes", result in final products, for example $LiFePO_4$, in the form of particles whose size is considerable.

This characteristic of the product means that its properties, as electrode material, are not good and that, consequently, the performance levels of the batteries in which these compounds are employed are not satisfactory.

In particular, in the case of $LiFePO_4$, the compounds obtained by the "all solid" synthesis route require long heat treatment periods, involving the use of gases (generally inert or slightly reducing) which are very highly pure, i.e. with an oxygen content of less than or equal to 1 ppm. If this is not the case, the material has a high $Fe^{3+}$ content which is harmful to its specific capacity.

The presence of the $Fe^{+++}$ impurity is harmful to the capacity since only $Fe^{++}$ participates in the electrochemical reaction.

Processes for the aqueous synthesis of active materials consist, for example, of the precipitation of phosphates or of a hydrothermal synthesis.

Moreover, there is another category of processes for synthesizing active materials, which are called "sol-gel" processes by some and "liquid mix" processes by others, which are, in all cases, based on a mild chemistry in solution of oxide compounds. These processes have the advantage of resulting in the production of pure powders having a large specific surface area with a small crystallite size.

These processes generally consist in synthesizing a precursor, generally amorphous, optionally polymeric, which can be obtained from various organic compounds such as citric acid and ethylene glycol and containing the cations to be associated in the final compound. One of the organic compounds most commonly plays the role of ligand for one or more metal ions, the formation of complexes making it possible to ensure better homogeneity of the precursor and therefore of the final product. These processes have been used in the past to develop numerous oxide compounds, and more recently electrode compounds for lithium batteries, such as $LiMn_2O_4$, as is described in the document by K. DU and H. ZHANG "Preparation and performance of spinel $LiM_2O_4$ by a citrate route with combustion", Journal of Alloys and Compounds, 352, (2003), p. 250-254.

Among these processes, mention may in particular be made of the processes referred to as "Pechini process or method", illustrated in document U.S. Pat. No. 3,330,697, and the process referred to as pyrolysis of organic precursors, illustrated in document BE-A-735476.

In addition, the processes described in documents WO-A-02 83555 and CH-A-513 769 make use of extremely long thermal treatments resulting in very large particle sizes.

More specifically, document U.S. Pat. No. 3,330,697 describes a process for preparing a ceramic composition, in which is dissolved at least one element of the group consisting of oxide hydrates, alcoholates, titanium alpha-hydroxycarboxylates, niobium, and zirconium with citric acid in a polyol such as ethylene glycol, and then at least one metal compound chosen from the group consisting of lead oxides, hydroxides, carbonates and alcoholates and alkaline earth metal oxides, hydroxides, carbonates and alcoholates is dissolved in a solution obtained, and the composition is subjected to a sufficiently high temperature to eliminate the organic compounds therefrom.

The use of such "sol-gel" synthesis pathways in which the aim is to obtain a product free of impurities and, inter alia, of carbon requires that the calcination or pyrolysis of the precursor be carried out in a sufficiently oxidizing medium, so as to eliminate the carbon-based residues in the form of CO or $CO_2$.

In the majority of cases, given the bringing together of carbon-based material and of an oxidant (nitrate ions or atmospheric oxygen from calcination, most commonly), the thermal decomposition of the precursor, sometimes called xerogel, occurs exothermically and is activated at relatively low temperature; reference is then made to self-combustion reactions. Thus, through a judicial choice of the oxidant/reducing agent ratio, inter alia, the powder obtained can consist of very fine grains due (i) to the low temperature required for obtaining the targeted compound given that the mixture formed by the precursor, which is homogeneous on an atomic scale, already corresponds to the desired stoichiometry and to the fact that the self-combustion results in an abrupt increase in the temperature of the medium in a very short period of time, the crystallites not having the time to grow, and (ii) to the rapid release of gas (blowing effect) which gives the powder an ash-like appearance.

It should be noted, on the contrary, that too high a pyrolysis temperature has a tendency to result in the formation of grains which are fine but solidly agglomerated.

To obtain the desired composite comprising the active material and the electronically conducting compound, it is always necessary, at the end of the synthesis of the active material, in particular via the sol-gel route, to grind or mix this active material with, for example, a carbon-based precursor or with the carbon itself. The obtaining of the desired particle size, generally of the fine particle size, requires further operations, in particular grinding and sieving operations.

A need therefore exists for a process of preparing a composite material comprising an electrochemically active material or electrode active material, and an electronically conducting compound such as carbon, which is simple, which has a limited number of steps, themselves simple, and which is rapid, safe, reliable and inexpensive.

A need also exists for a process for preparing a composite material which gives highly pure final products which have a completely controlled and homogeneous morphology, which exhibit excellent properties of electrochemical kinetics, and which can be used at high charging/discharging rates.

In particular, a need exists for a process which makes it possible to readily and simply obtain a final product which is weakly agglomerated (and/or in which the agglomerates are weakly destroyed) and which has an extremely fine and controlled microstructure.

The aim of the present invention is to provide a process for preparing a composite material comprising an electrode active compound such as a lithium insertion compound, and an electronically conducting compound such as carbon, which satisfies, inter alia, the needs listed above.

The aim of the present invention is also to provide a process for preparing a composite material comprising an electrode active compound, also called electrochemically active compound, and an electronically conducting compound, which does not exhibit the drawbacks, deficiencies, limitations and disadvantages of the processes of the prior art and which solves the problems of the processes of the prior art.

This aim, and other aims, are achieved, in accordance with the invention, by virtue of a process for preparing a composite material comprising an electrode active compound of formula $A_aD_dM_mZ_zO_oN_nF_f$ in which:

A is an alkali metal,
D is chosen from alkaline earth metals and elements of column III of the Periodic Table of Elements, with the exclusion of B,
M is a transition metal or a mixture of transition metals,
Z is a non-metal chosen from S, Se, P, As, Si, Ge, Sn and B,
O is oxygen, N is nitrogen and F is fluorine,
a, d, m, z, o, n and f are real numbers greater than or equal to 0 and are chosen so as to ensure electroneutrality;
and an electronically conducting compound such as carbon;

in which a homogeneous mixed precursor containing all the elements A, D, M, Z, O, N and F forming the electrode active compound and also one or more organic and/or organometallic compounds are thermally decomposed so as to obtain the composite material.

Advantageously, said organic and/or organometallic compounds are carbon-based compounds, i.e. compounds comprising carbon, and preferably these compounds comprise a predominant (major) atomic proportion of carbon.

Advantageously, A is chosen from Li and Na, and mixtures thereof. The active compound is, in this case, an alkali metal insertion compound. Preferably, A is lithium, and the electrode active compound is then a lithium insertion compound.

Advantageously, D is chosen from Mg, Al and Ga, and mixtures thereof.

Advantageously, M is chosen from Fe, Ni, Co, Mn, V, Mo, Nb, W and Ti, and mixtures thereof.

The preferred electrode active compounds are chosen from lithium insertion compounds and sodium insertion compounds.

Examples of these compounds are $LiFePO_4$, $LiFeBO_3$ and $NaFeBO_3$.

The electronically conducting compound is preferably carbon and the final percentage by mass of electronically conducting compound such as the carbon in the composite material is generally from 0.1% to 55% by mass, preferably from 0.2% to 15% by mass.

The thermal decomposition, i.e. decomposition under the effect of heat, of the homogeneous mixed precursor, which can also be described as pyrolysis or calcination, is generally carried out under vacuum or else in a controlled atmosphere.

According to the invention, this thermal decomposition is carried out over a short duration, over short periods of time.

The controlled atmosphere is preferably an inert or slightly reducing atmosphere.

The inert atmosphere is generally an atmosphere comprising argon, or nitrogen or any other inert gas, or a mixture thereof.

These gases are preferably highly pure, i.e. the oxygen concentration of each gas and of the atmosphere is generally less than or equal to 1 ppm.

The slightly reducing atmosphere is generally an atmosphere comprising a few %: generally 1% to 5% or 10% (3%, for example), of hydrogen gas in argon or nitrogen or any other inert gas, or mixtures thereof.

The thermal decomposition of the mixed homogeneous precursor is generally carried out at a moderate temperature, less than 900° C., preferably less than or equal to 800° C., and more preferably less than or equal to 750° C.

Generally, the thermal decomposition is also carried out at a temperature above 200° C., in particular in the region of 600° C.

The expression "short duration, short periods of time of thermal decomposition, of thermal treatment" is intended to mean durations generally less than or equal to 1 hour, preferably less than or equal to 30 minutes. The thermal decomposition is generally carried out over a duration of 5 minutes to 1 hour, preferably of 10 minutes to 30 minutes, for example of 15 minutes.

Generally, the homogeneous mixed precursor compound is prepared by bringing one or more compound(s) containing one or more element(s) chosen from the elements A, D, M, Z, O, N and F forming the electrode active compound into contact, on the molecular scale, with one or more organic and/or organometallic, preferably carbon-based, compound(s) capable of being thermally decomposed (heat-decomposable), in order to obtain a mixture of said compound(s) containing one or more element(s) chosen from the elements A, D, M, Z, O, N and F and of said organic and/or organometallic compound(s).

It should be noted that, when said compounds are organometallic compounds, they can optionally contain one or more element(s) chosen from A, D, M and Z.

The respective proportions and the respective compositions of said compound(s) containing one or more elements chosen from A, D, M, Z, O, N and F and of said organic and/or organometallic, preferably carbon-based, compound(s), which are thermally decomposable, are chosen so as to observe the proportions—defined in particular by the coefficients a, d, m, z, o, n and f—of the elements A, D, M, Z, O, N and F, and of the carbon, in the final composite material.

Said bringing into contact can be carried out in solution, which can sometimes have one or more phases in fine suspension, or else by a mechanical action which is generally strong—referred to as trituration—on the "precursor" mixture of the constituents. In the latter case, this is not strictly speaking a solid state synthesis since, by virtue of the mechanical action on the precursor mixture, which is initially solid, a solution is formed without the addition of or with very little addition of solvent, by using, for example, the water from crystallization of one or of the precursors.

Generally, at the end of the bringing into contact, the mixture obtained is dried so as to give said mixed precursor compound.

Generally, said mixed precursor compound is in the form of an amorphous solid, which is then subjected to thermal decomposition.

The process according to the invention comprises a single main specific step consisting of decomposition of the homogeneous mixed precursor in a relatively short period of time, i.e. a duration generally less than or equal to 1 hour, and preferably less than or equal to 30 min.

The process according to the invention is fundamentally different from the processes of the prior art, both with regard to the number of steps carried out, and their nature, and in particular with regard to the thermal treatment step, which must be short.

The processes of the prior art, such as those described in documents WO-A-02 83555 and CH-A-513 769, comprise thermal treatment, thermal decomposition steps which are much longer than those of the process according to the invention and it has been noted that these long periods, required in the prior art to obtain the desired purity and homogeneity, result in large particle sizes.

The short duration of the thermal decomposition step of the process of the invention results in small particle sizes, but, surprisingly, these particles are, however, highly pure and highly homogeneous. The process according to the invention thus goes against a preconceived idea that is very widespread in the prior art and triumphs over this preconceived idea.

The process according to the invention solves the problems of the processes of the prior art for the preparation of composite materials comprising an electrode active compound and an electronically conducting compound such as carbon, and remedies the drawbacks, deficiencies, limitations and disadvantages of these processes.

The process according to the invention is simple, reliable and rapid, comprises a single main step, and uses readily available and inexpensive reactants.

The process according to the invention gives a highly pure final product. As a result, the materials prepared by the invention do not require any additional purification step for their use, for example before their integration into the positive electrode material of a battery.

The material obtained, by virtue of the process for preparing it, and in particular by virtue of the short duration of the thermal decomposition step, exhibits a completely controlled morphology, as regards the size of the particles which constitute it.

These particles are weakly agglomerated, and the few agglomerates that exist can be readily destroyed. In addition, these particles are perfectly homogeneous in terms of size. The product obtained has an extremely fine and controlled microstructure and, in this case, the term "nanocomposites" can be used.

This control of the size, of its homogeneity and of the resulting microstructure results in excellent performance levels for the batteries which integrate the materials prepared by the process of the invention, as regards their specific energy and their behaviour in terms of power in particular.

Fundamentally, the process according to the invention, unlike the processes of the prior art, makes it possible to obtain, directly, in a single step, an extremely fine powder, comprising grains with very little agglomeration, of the compound $A_aD_dM_mZ_zO_oN_nF_f$, intimately mixed with the electronically conducting compound, such as carbon.

In the process according to the invention there is no need to carry out subsequent steps, and in particular there is no need for subsequent grinding or mixing with a carbon-based precursor such as carbon itself or else for sieving or sorting so as to obtain the desired fineness.

The fact that it is possible to obtain, in just one single step, directly, and with a short thermal decomposition time, such a composite material of such quality, which is a powder of extremely fine active compound intimately mixed with carbon, is entirely surprising and can in no way be deduced from the prior art.

It is completely surprising that this great simplicity of the process goes together with the extremely fine nature of the crystallites of powder obtained.

The invention will now be described in greater detail in the subsequent text.

In the process according to the invention, the first step is to prepare a homogeneous mixed precursor, containing all the elements A, D, M, Z, O, N and F forming the electrode active compound or electrochemically active compound, and also one or more organic and/or organometallic, preferably carbon-based, compounds.

This homogeneous mixed precursor is generally prepared by bringing one or more compounds containing one or more among the elements A, D, M, Z, O, N and F forming the electrode active compound into contact, on the molecular scale, with one or more organic and/or organometallic, preferably carbon-based, compounds capable of being thermally decomposed under the conditions of the (short) thermal decomposition treatment resulting in the composite material, in order to obtain a mixture of said compounds containing the elements A, D, M, Z, O, N and F and of said organic and/or organometallic, preferably carbon-based, compounds.

If organometallic compounds are used, these compounds contain one or more elements chosen from A, D, M and Z.

Said bringing into contact can be carried out in solution, it being possible for said solution to sometimes optionally have one or more phases in fine suspension.

In a first embodiment, a solution of ions containing the elements to be associated in the compound $A_aD_dM_mZ_zO_oN_nF_f$, and of one or more organic or organometallic, preferably carbon-based, compounds capable of thermally decomposing (heat-decomposable) is thus formed; preferably, said organic or organometallic compound(s) is (are) also optionally complexing compounds and/or also optionally polymerizable compounds.

Said solution is then concentrated very rapidly, so as to fix and dry it, which forms an amorphous product (homogeneous mixed precursor) which is then thermally decomposed.

The rapid concentrating of the solution results in a liquid generally having a high viscosity, at least greater than 200 centipoises at 20° C. for example, and this liquid is generally subsequently converted, by means of a stronger concentration under a vacuum of $10^{-3}$ atmosphere, for example, into an amorphous solid which is thermally decomposed in a short period of time defined above, to give the composite material according to the invention.

Advantageously glass in pulverulent form is obtained by drying by atomization of the liquid in a hot atmosphere at a temperature of 300° C., for example; the final product, composite material, can ideally be obtained by drying and calcination by atomization of the liquid in a sufficiently hot atmosphere. This step can be facilitated if the reaction is a self-combustion reaction which has already been described above.

To obtain a mixed precursor and then a composite material having a completely homogeneous composition, it is necessary to avoid any segregation of the metal species present in the solution, by preventing the deposition, in the form of any crystalline compounds, of one or more elements, during the evaporation process until the viscosity of the concentrated solution or suspension is high enough for it to be impossible for there to be any subsequent separation of the elements, during the decomposition per se.

This aim is specifically achieved in the invention, through the addition, to any solution of the elements to be associated, of the heat-decomposable, and preferably highly complexing, organic or organometallic compound(s).

The organic compounds are generally chosen from organic acids containing two acid functions or more (diacids, triacids, or more), such as oxalic acid, malonic acid, succinic acid, glutaric acid, adipic acid, maleic acid or fumaric acid; alcohol acids, such as glycolic acid, lactic acid, mandelic acid, hydroxyacrylic acid or hydroxybutyric acid; amino acids, such as aminoacetic acid, also called glycine, alanine, leucine, aminopropionic acid, ornithine, lysine or arginine; ketone acids, such as glyoxylic acid, pyruvic acid, ketobutyric acid or levulic acid; acids which are more complicated, bearing two or more acid functions and other alcohol, amine or carbonyl functions, such as malic acid, tartaric acid, citric acid, aconitic acid, citraconic acid, aspartic acid and glutamic acid; and mixtures thereof.

It is possible to use either an organic or organometallic compound alone, or a mixture of two or more thereof in various proportions.

In the process of the invention, the same carbon-based compounds are used to (i) optionally complex the cations in solution; (ii) fix said solution, including when it has one or more phases in fine suspension, by contributing to, or by being the cause of an increase in its viscosity by means of a suitable treatment; (iii) form the carbon providing the electronic conductivity of the composite; and (iv) serve as a combustible in the pyrolysis reaction which can sometimes be characterized as self-combustion.

It is also possible to use, when the complexing organic compound is an acid, ammonium salts or the salts of an organic base of this acid, or even directly a salt in which the cation is chosen from A, D or M. In certain cases, one or more oxoanions $(ZO_4)^{x-}$, due to their complexing nature, can be used to aid the conservation of homogeneity of the medium during the precursor formation step.

The solution obtained after rapid concentration constitutes the ("homogeneous, mixed") precursor; it is a homogeneous solution which is very viscous and can even be solid, but which is non-crystallized.

The precursors obtained have, in addition to the advantage of perfect homogeneity on the microscopic scale, that of being very readily produced. The precursors used in the process of the invention are obtained from any salts of the desired elements, dissolved beforehand in a solvent or not yet dissolved, by simple addition of a complexing substance and, optionally, of a usual acid or base intended to facilitate the dissolution of the elements or to reinforce the stability of the solution.

Said precursors also have the advantage of associating the metal species in the chosen proportions contrary to other precursors.

For the production of the precursor, use is, for example, made of a solution containing the desired elements even in the form of complex ions, or else in any other form which is stable, optionally of a fine suspension, under the pH conditions of the medium. More specifically, any soluble or solubilizable salt containing one or more elements, decomposable under the conditions of preparation of the final material, can be used; it may also be a salt of an acid containing one of the elements that it is desired to associate, suspensions containing one or more substances not dissolved in the solvent, such as the metals or the metalloids themselves in elemental form, poorly soluble oxides or salts, provided that these substances dissolve under the action of the organic compound(s) generally playing the role of complexing agent or of the other components of the mixture.

It may also be that the presence of the various elements in solution leads to the formation of a slight precipitate (which corresponds to the phases in suspension described above). In this case, the homogeneity of the medium, and in particular the stability of the suspension, is facilitated by the presence of the advantageously complexing organic or organometallic compound(s) and also by agitation of the medium.

The solution or the suspension containing the elements to be associated in the desired proportions in the active material (defined in particular by the coefficients a, d, m and z) has added to it one or more organic or organometallic compounds as defined above which advantageously play the role of complexing substance and, optionally, an acid or a base that facilitates the dissolution, solubilization (bringing into solution).

The proportions of the organic or organometallic compound(s) which play(s) the role of complexing substance depend on the composition of elements to be associated and also on the amount of electronically conducting compound, such as the carbon that the composite must contain; from 0.1 to 10, preferably from 0.5 to 2 gram-equivalents of organic or organometallic compound, for example of acid, per gram-equivalent to be complexed are normally used; these amounts are given by way of indication and can in no way be considered to be imperative, it being possible to obtain good results with different proportions.

In certain cases, in order to facilitate the dissolution, an acid and/or a base chosen in such a way that they decompose without leaving any residue is/are added in a sufficient amount to solubilize the elements to be associated. If the addition of such a substance is necessary, the amount to be added preferably corresponds to the stoichiometry of the known soluble compounds of the elements and of the acid and/or of the base.

The salts are dissolved both in a neutral, basic or acid aqueous solution and in a liquid other than water. The usual solvents preferably containing from 1 to 20 carbon atoms per molecule, such as dimethylformamide, dimethyl sulphoxide, N-methylpyrrolidone, dioxane, nitromethane, nitrobenzene, nitrates, alcohols or ketones, are entirely suitable.

The solution or suspension obtained is then evaporated, either at atmospheric pressure, or under vacuum, until a viscous syrup or an amorphous solid is obtained. The quality of the precursor obtained depends both on the composition of the mixture and on the methods of this evaporation. The latter must be as rapid as possible, optionally accompanied by intense agitation of the solution, in order to prevent any crystallization. Preferably, the procedure is carried out under reduced pressure, i.e. generally under a primary vacuum, for example, close to $10^{-2}$ atmosphere to $10^{-3}$ atmosphere. A method for obtaining this result is to first evaporate the solution in a rotary evaporator until a clear viscous product is obtained. The viscosity of this concentrated solution must be high, for example greater than 200 centipoises at 20° C. This concentrated solution is then evaporated under vacuum at an equal or different temperature, until a solid is obtained, sometimes in the form of a hard and brittle glass. However, it is also possible to perform this evaporation according to other methods, and in particular in a single step. Irrespective of the method chosen, the evaporation can be carried out at any temperatures above or below the melting point of the solvent, or its boiling point. There is no viscosity upper limit.

Lyophilization processes, firstly, and spray-drying processes, secondly, are other methods for eliminating the solvent.

The precursor obtained after the pretreatment is sometimes also in the form of a very light foam, consisting of the fine chips of a glass, the coloration of which depends mainly on the nature and on the concentration of metal ions.

It is also possible to obtain a precursor which exhibits low crystallinity.

In a second embodiment, a solution or suspension, preferably very stable, of ions containing the elements to be associated in the compound $A_aD_dM_mZ_zO_oN_nF_f$ and of one or more organic or organometallic, preferably carbon-based compounds capable of thermally (heat) decomposing, is formed; preferably, said organic compound(s) are also complexing compounds and, advantageously they are also polymerizable compounds.

This solution in fact contains the same component as that prepared in the first embodiment, and is prepared in the same manner.

A compound, generally a polyol or a polyamine, is added to this solution so as to polymerize the entire solution in order to form a gel.

The polyol is preferably chosen from glycols, more preferably from ($C_1$ to $C_6$)alkylene and ($C_1$ to $C_6$) (poly)alkylene glycols, such as ethylene glycol and diethylene glycol.

The gel obtained is dried in the same manner as previously and the dried gel therefore constitutes the homogeneous mixed precursor according to the invention; it is then pyrolyzed in an atmosphere judicially chosen to leave the required amount of carbon intimately mixed with the electrochemically active compound $A_aD_dM_mZ_zO_oN_nF_f$.

In a third embodiment, a solution of ions containing the elements to be associated in the compound $A_aD_dM_mZ_zO_oN_nF_f$ is formed and one or more water-soluble gelling organic compounds capable of forming an organic gel entrapping said ions is (are) added to this solution, in order to form an organic gel entrapping said ions; said gel is then dried generally under the same conditions as above.

This or these "gelling" organic compound(s) is (are) preferably chosen from (meth)acrylamides, (meth)acrylates and polymerizable carbohydrates, such as starch and more specifically saccharides and derivatives thereof.

In a fourth embodiment, the "homogeneous mixed" precursor used in the process according to the invention is obtained by direct sol-gel polymerization between an alkoxide of the element Z (a non-metal) such as silicon, for example, and a generally complexing oxoanion such as $(ZO_4)^{x-}$ (or a precursor thereof) in a solution, for example an aqueous solution, of ions, containing the elements A, D and M to be associated in the compound $A_aD_dM_mZ_zO_oN_nF_f$, such that the metals A, D and M are trapped in the network thus formed, and then by drying, generally as defined above.

By decomposition in a judiciously chosen atmosphere, the composite $A_aD_dM_mZ_zO_oN_nF_f$ is subsequently formed.

As has already been indicated above, the bringing into contact, instead of being carried out in solution, or in general by means of an essentially liquid process, can also be carried out by means of an essentially solid process called mechanical trituration, in which the mixing of the compounds of the elements to be associated in the electrochemically active compound to be prepared, with the heat-decomposable organic or organometallic compound(s), is carried out, the duration of the mechanical trituration being sufficient to obtain a homogeneous solution containing the organic and organometallic compound(s) and the compounds of the elements to be associated in the active compound.

The viscous homogeneous solution is converted, by dehydration under vacuum, into a vitreous substance, which is subsequently thermally decomposed.

This embodiment, in which the starting material is a mixture of acid salts in the crystalline state, the solubilization of which is obtained by means of the water from crystallization of the salts, has the following advantages:

since the solubilization, dissolution (bringing into solution) of the starting reactants is obtained by simple mechanical trituration, and no longer by the introduction of water or of solvent, there is no longer any need to evaporate off this water or this solvent;

in addition, the fact consisting in passing directly from the solid reactants in the crystalline or amorphous state to the viscous solution makes it possible to avoid the precipitation phenomena which can possibly occur during the solution concentration step, and which make it necessary to observe certain well-determined operating conditions, and in particular to perform quite a rapid evaporation of the solution.

The mixture of the starting salts and/or of the organic or organometallic compounds can optionally have added to it an acid and/or a base chosen in such a way that they decompose without leaving any residue, in sufficient amounts to solubilize the elements to be associated.

For similar reasons, it is also possible to add water and/or a liquid, other than water, to the mixture. The amount of water and/or of solvent added will, in all cases, be less than the minimum amount which should be used in order to obtain a viscous homogeneous solution, when the solubilization of the starting reactants is carried out by introduction of water or of a solvent.

The solid salts and the organic compound(s), coarsely mixed beforehand using, for example, a mortar, are introduced into a device such as a mixer, a roller blender, a mill or a mortar, in order to be ground and blended. A sigmoid blade blender, which gives the best results, will preferably be used.

The blending of the solid salts and of the organic or organometallic compound(s), optionally in the presence of the various abovementioned optional substances, is carried out at a temperature of between the temperature at which freezing of the solution to be obtained begins and 150° C., and preferably at a temperature of between 0 and 90° C., for a period of time sufficient for a clear solution, of sufficient viscosity, for example greater than 200 centipoises at 20° C., to be obtained.

This liquid can, as was underlined above, be spray-dried, or dehydrated under vacuum, generally under a primary vacuum, for example of $10^{-2}$ to $10^{-3}$ atmosphere, to an amorphous solid.

In this embodiment, it is no longer necessary to carry out a very rapid concentration of the solution, the risks of precipitation during the concentration step being avoided.

It is often advantageous to prepare the precursor in the same device, by simultaneously combining the effect of the mechanical trituration, the application of a vacuum, for example of a primary vacuum ($10^{-2}$ to $10^{-3}$ atmosphere, for example), and the application of a temperature between the above limits. The viscosity of the abovementioned solution then increases and the latter becomes spontaneously converted to a pulverulent mass, corresponding to a vitreous or amorphous precursor.

The conversion time is conditioned by the amount of water or solvent to be removed, and by the temperature and pressure at which said conversion is carried out.

At the end of the preparation of the homogeneous mixed precursor, the decomposition of this homogeneous mixed precursor is carried out, which process can also be described as pyrolysis or as calcination.

This decomposition can be carried out under vacuum, for example in a vacuum of $10^{-2}$ to $10^3$ atmosphere, or else under a controlled atmosphere in short periods of time, already defined above, of the order of 15 minutes, for example.

The term "controlled atmosphere" is intended to mean an atmosphere whose composition is completely mastered and judiciously chosen.

The controlled atmosphere is preferably an inert or slightly reducing atmosphere. The inert atmosphere is generally an atmosphere consisting of nitrogen or of argon, or of any other inert gas, or of a mixture thereof; preferably, these gases are highly pure, i.e., generally with an $O_2$ content $\leq 1$ ppm.

The slightly reducing atmosphere is generally an atmosphere comprising a few %, generally from 1% to 5% or 10% (3%, for example) of hydrogen gas in argon, nitrogen or any other inert gas, or mixtures thereof.

The thermal decomposition of the precursor is generally carried out at a temperature which can be described as moderated, i.e. a temperature generally less than 900° C., preferably less than or equal to 800° C., and more preferably less than or equal to 750° C.

In addition, the thermal decomposition is generally carried out at a temperature above 200° C., and in particular in the region of 600° C.

This decomposition, calcination, is sometimes the seat of a highly exothermic reaction characteristic of the self-combustion reactions associated with a substantial release of gas in a relatively short period of time, which is reflected by the crystallites of powder obtained being extremely fine.

This decomposition can be carried out in a fixed bed, in a mobile bed or in a fluid bed. It is even possible to carry out the drying of the solution or of the gel and the decomposition of the precursor simultaneously, provided that the succession of the operations is controlled. Spraying in a hot atmosphere can make it possible to achieve this aim. In general, it is advisable to bring about as rapid a calcination as possible, in order to avoid element segregations during the stages where the final composite has not yet formed.

Irrespective of the appearance and the characteristics of the starting precursor (glass, lake, foam, spherules or spherical grains), the final product obtained, which has just been defined and which comes from its thermal decomposition, is generally in the form of a light ash, consisting of very fine grains, usually of between 100 and 5000 Å in size, and which also generally has a high specific surface area, i.e., generally of from 10 to 50 $m^2/g$.

The invention claimed is:

1. Process for preparing a composite material comprising an electrode active compound of formula $LiFePO_4$
   and an electronically conducting compound, the process consisting essentially of:
   forming a homogeneous mixed precursor containing all the elements Li, Fe, P, and O, and one or more organic and/or organometallic compounds; and
   thermally decomposing the precursor in one hour or less to obtain the composite material.

2. Process according to claim 1, in which said organic and/or organometallic compound(s) comprise a predominant atomic proportion of carbon.

3. Process according to claim 1, in which the final percentage by mass of electronically conducting compound is from 0.1% to 55%.

4. Process according to claim 1, in which the thermal decomposition of the homogeneous mixed precursor is carried out under vacuum.

5. Process according to claim 1, in which the thermal decomposition of the homogeneous mixed precursor is carried out in a controlled atmosphere.

6. Process according to claim 5, in which the controlled atmosphere is an inert or slightly reducing atmosphere.

7. Process according to claim 1, in which the thermal decomposition of the homogeneous mixed precursor is carried out at a temperature of less than 900° C.

8. Process according to claim 7, in which the thermal decomposition is also carried out at a temperature above 200° C.

9. Process according to claim 1, in which the thermal decomposition is carried out over a duration of 5 minutes to 1 hour.

10. Process according to claim 1, in which the respective proportions and the respective compositions of said elements and of said organic and/or organometallic, compound(s), which are thermally decomposable, are chosen so as to observe the proportions of the elements and of the at least one electronically conducting compound, in the final composite material.

11. Process according to claim 1, in which the precursor formation is carried out in solution optionally having one or more phases in fine suspension.

12. Process according to claim 1, in which the precursor formation comprises trituration.

13. Process according to claim 1, in which the precursor formation comprises drying the precursor prior to thermal decomposition.

14. Process according to claim 11, in which the homogeneous mixed precursor is prepared by forming a solution of ions containing the elements to be associated in the compound $LiFePO_4$ and of one or more organic or organometallic compounds capable of thermally decomposing, which are and by then very rapidly concentrating said solution so as to fix it and to dry it.

15. Process according to claim 11, in which the homogeneous mixed precursor is prepared by forming a solution of ions containing the elements to be associated in the compound $LiFePO_4$ and of one or more organic or organometallic, compounds capable of thermally decomposing, and by adding a polyol or a polyamine to said solution in such a way as to carry out a polymerization so as to form a gel, and by drying said gel.

16. Process according to claim 14, in which said organic or organometallic compound(s) capable of thermally decomposing, is (are) selected from the group consisting of organic acids containing two acid functions or more, alcohol acids, amino acids, ketone acids, acids bearing two or more acid functions and other alcohol, amine or carbonyl functions, and mixtures thereof.

17. Process according to claim 15, in which said polyol is chosen from glycols.

18. Process according to claim 11, in which the homogeneous mixed precursor is prepared by forming a solution of ions containing the elements to be associated in the compound $LiFePO_4$, and by adding to this solution one or more water-soluble gelling organic compounds, in order to form an organic gel comprising said ions, and then by drying said gel.

19. Process according to claim 18, in which said gelling organic compound(s) is (are) chosen from (meth)acrylamides, (meth)acrylates and polymerizable carbohydrates.

20. Process according to claim 11, in which the homogeneous mixed precursor is prepared by direct sol-gel polymerization between an alkoxide, and a generally complexing oxoanion, in a solution of ions containing the elements Li and Fe to be associated in the compound $LiFePO_4$ such that Li and Fe are trapped in the network thus formed, and then by drying.

21. Process according to claim 1, in which the composite material is in the form of a light ash consisting of very fine grains of between 100 and 5000 Å in size.

22. Process according to claim 21, in which the composite material also has a specific surface area of from 10 to 50 $m^2/g$.

23. Process according to claim 1, wherein the electronically conducting compound is carbon.

24. Process according to claim 10, wherein the electronically conducting compound is carbon.

25. Process according to claim 14, wherein the organic or organometallic compound(s) is (are) complexing.

26. Process according to claim 15, wherein the organic or organometallic compound(s) is (are) complexing.

27. Process according to claim 16, wherein the organic or organometallic compound(s) is (are) complexing.

* * * * *